US012798470B2

(12) United States Patent
Nomura

(10) Patent No.: US 12,798,470 B2
(45) Date of Patent: Nov. 17, 2026

(54) VEHICLE LIGHT DISTRIBUTION CONTROL DEVICE

(71) Applicant: TOYOTA JIDOSHA KABUSHIKI KAISHA, Toyota (JP)

(72) Inventor: Takuya Nomura, Chita-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/032,772

(22) Filed: Jan. 21, 2025

(65) Prior Publication Data

US 2025/0263011 A1 Aug. 21, 2025

(30) Foreign Application Priority Data

Feb. 20, 2024 (JP) ................................ 2024-023572

(51) Int. Cl.
*B60Q 1/14* (2006.01)

(52) U.S. Cl.
CPC ................................ *B60Q 1/1415* (2013.01)

(58) Field of Classification Search
CPC ...... B60Q 1/14; B60Q 1/1415; B60Q 1/1423; B60Q 1/143
See application file for complete search history.

(56) References Cited

U.S. PATENT DOCUMENTS

| | | | | |
|---|---|---|---|---|
| 10,759,329 | B2 | 9/2020 | Morimura et al. | |
| 10,946,791 | B2 | 3/2021 | Morimura et al. | |
| 11,260,789 | B2 | 3/2022 | Morimura et al. | |
| 2016/0009296 | A1 | 1/2016 | Iguchi et al. | |
| 2020/0150702 | A1 | 5/2020 | Ueda | |
| 2023/0019153 | A1 * | 1/2023 | Maruyama ........... | B60Q 1/0005 |

FOREIGN PATENT DOCUMENTS

| | | | | |
|---|---|---|---|---|
| JP | H04-166474 | A | 6/1992 | |
| JP | 2016-016765 | A | 2/2016 | |
| JP | 2023-073045 | A | 5/2023 | |
| WO | WO-2022130866 | A1 * | 6/2022 | ............ B60Q 1/143 |

* cited by examiner

*Primary Examiner* — Jimmy T Vu
(74) *Attorney, Agent, or Firm* — SoraIP, Inc.

(57) ABSTRACT

The vehicle light distribution control device makes a light distribution control activation proposal, which is a proposal for activating a light distribution control function to an occupant of the vehicle, when the scene in which the vehicle having the light distribution control function travels is a recommendation scene in which the use of the light distribution control function of the headlight of the vehicle is recommended.

2 Claims, 4 Drawing Sheets

VEHICLE LIGHT DISTRIBUTION CONTROL DEVICE

CROSS-REFERENCE TO RELATED APPLICATION

This application claims priority to Japanese Patent Application No. 2024-023572 filed on Feb. 20, 2024, incorporated herein by reference in its entirety.

BACKGROUND

1. Technical Field

One aspect of the present disclosure relates to a vehicle light distribution control device.

2. Description of Related Art

There is known a device in a vehicle having a light distribution control function for headlights, such as Auto High Beam (AHB) or Adaptive Driving Beam (ADB). The device automatically activates the light distribution control function based on light distribution control area information obtained by determining an area that requires light distribution control (see, for example, WO 2022/130866).

SUMMARY

Since the above device automatically activates the light distribution control function as described above, an occupant who considers that the light distribution control function is unnecessary may be annoyed.

Therefore, an object of one aspect of the present disclosure is to provide a vehicle light distribution control device capable of reducing the annoyance of an occupant who considers that a light distribution control function is unnecessary.

The vehicle light distribution control device according to the one aspect of the present disclosure is configured to, when a scene in which a vehicle having a light distribution control function travels is a recommendation scene in which use of the light distribution control function is recommended, make a light distribution control activation proposal to an occupant of the vehicle to propose activation of the light distribution control function.

The vehicle light distribution control device according to the one aspect of the present disclosure may be configured to, when the scene in which the vehicle travels is the recommendation scene, make determination as to whether to make the light distribution control activation proposal based on the number of times of ignition-on and a travel distance of the vehicle since the light distribution control activation proposal was made previously, and make the light distribution control activation proposal according to a result of the determination.

In the vehicle light distribution control device according to the one aspect of the present disclosure, the recommendation scene may be a scene in which a brightness of surroundings of the vehicle is low continuously for a predetermined period or longer at night, and the vehicle light distribution control device may be configured to make the light distribution control activation proposal when the scene in which the vehicle travels is the recommendation scene, the number of times of ignition-on of the vehicle since the light distribution control activation proposal was made previously is equal to or larger than a predetermined number of times, and the travel distance of the vehicle since the light distribution control activation proposal was made previously is equal to or larger than a predetermined distance.

The vehicle light distribution control device according to the one aspect of the present disclosure may be configured to make the light distribution control activation proposal when the scene in which the vehicle travels is the recommendation scene, an activation rate of the light distribution control function is equal to or lower than a predetermined value, the number of times of ignition-on of the vehicle since the light distribution control activation proposal was made previously is equal to or larger than the predetermined number of times, and the travel distance of the vehicle since the light distribution control activation proposal was made previously is equal to or larger than the predetermined distance.

According to the one aspect of the present disclosure, it is possible to provide the vehicle light distribution control device capable of reducing the annoyance of the occupant who considers that the light distribution control function is unnecessary.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
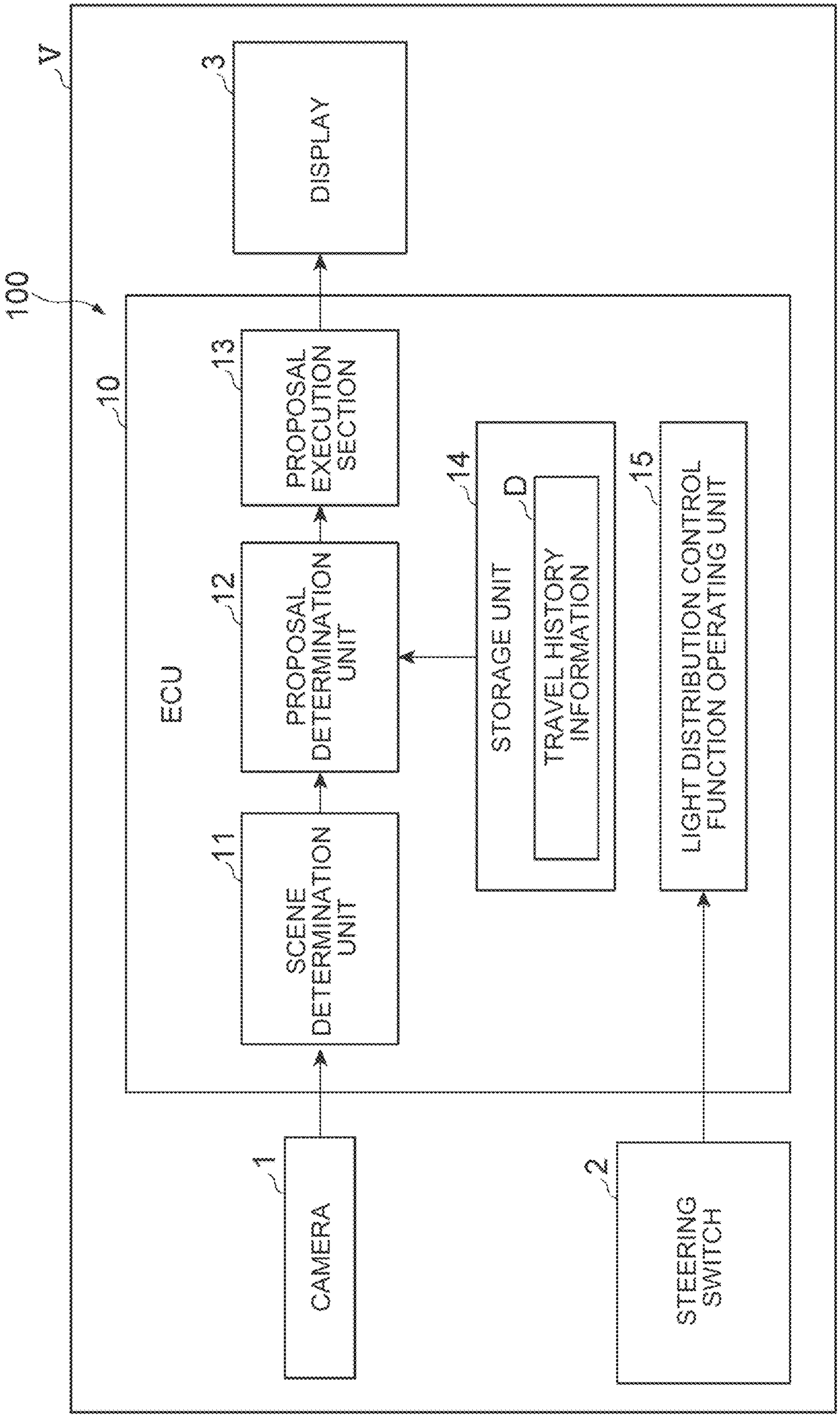
FIG. 1 is a block diagram illustrating a configuration of a vehicle light distribution control device according to an embodiment.

Hereinafter, embodiments will be described in detail with reference to the accompanying drawings. In the description of the drawings, the same or corresponding elements are denoted by the same reference numerals, and redundant description will be omitted.

As illustrated in FIG. 1, the vehicle light distribution control device 100 according to the present embodiment is mounted on a vehicle V. The vehicle V may be a passenger car or a freight car. The vehicle V can be occupied by one or more occupants. The vehicle V may be an autonomous vehicle capable of autonomous driving [Autonomous Driving]. The vehicle V may be capable of being manually driven by a driver. The vehicle V of the present embodiment includes a light distribution control function (hereinafter, also simply referred to as a "light distribution control function") of a headlight of the vehicle V. The headlight is a lamp that illuminates the front of the vehicle V. The headlight is not particularly limited, and various known headlights may be used.

The light distribution control function is a control function related to a highlight beam of a headlight of the vehicle V. The light distribution control function may be, for example, at least one of AHB (Auto High Beam) and ADB (Adaptive Driving Beam). AHB is, for example, a function of automatically switching off and on the high beam in accordance with whether or not another vehicle is present in front of the vehicle V at night. ADB is, for example, a function of automatically blocking a high beam only in an area where another vehicle in front of the vehicle V exists at night. The light distribution control function is not particularly limited, and may be a function related to other high beams. In the present embodiment, the light distribution control function is an AHB. The front side of the vehicle V corresponds to the irradiation direction of the headlight of the vehicle V.

When the scene in which the vehicle V travels is a recommendation scene in which the use of the light distribution control function of the vehicle V is recommended, the vehicle light distribution control device 100 performs a light distribution control activation proposal to be described later, which is a proposal for operating the light distribution control function for the occupant (including the driver) of the vehicle V. The vehicle light distribution control device 100 includes an ECU 10.

ECU 10 is an electronic control unit with CPU (Central Processing Unit), ROM (Read Only Memory), RAM (Random Access Memory), etc. In ECU 10, for example, various functions are realized by loading a program stored in a ROM into a RAM and executing the program loaded in RAM by a CPU. Some of the functions of ECU 10 may be performed in servers capable of communicating with vehicles V. ECU 10 may be composed of a plurality of electronic units. A camera 1, a steering switch 2, and a display 3 are connected to ECU 10.

Figure 2:
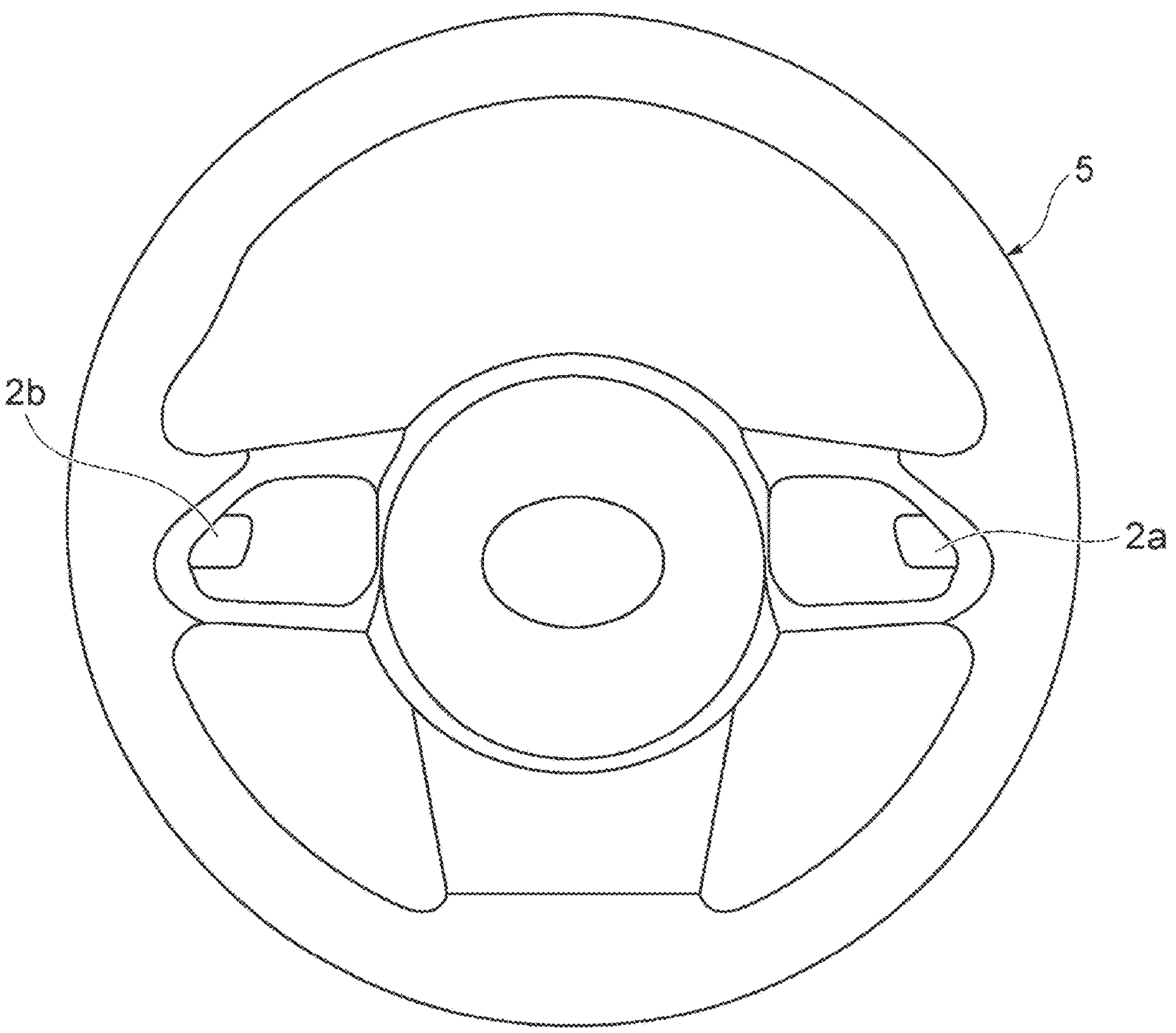
FIG. 2 is a diagram illustrating an example of the steering switch of FIG. 1.
Figure 3:
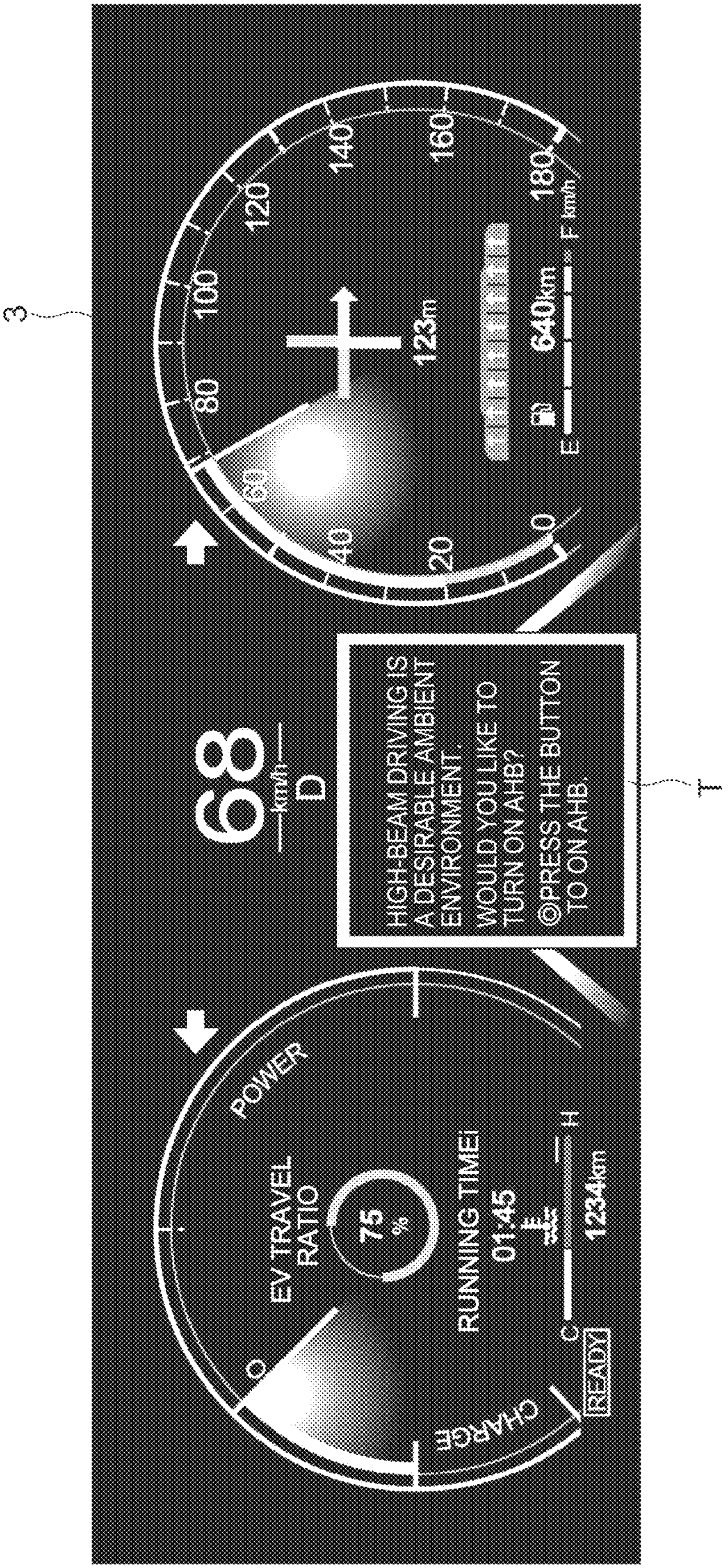
FIG. 3 is a diagram illustrating an exemplary light distribution control activation proposal displayed on the display of FIG. 1.

The camera 1 images at least a front portion of the periphery of the vehicle V. The camera 1 is not particularly limited, and various known imaging apparatuses may be used. The camera 1 transmits the acquired camera images to ECU 10. As shown in FIGS. 1 and 2, the steering switch 2 is a switch provided in the steering 5. In the illustrated embodiment, the steering switch 2 includes at least a determination switch 2*a* and a cancellation switch 2*b*. When the vehicle is operated by the occupant of the vehicle V, the steering switch 2 transmits an operation signal related to the operation to ECU 10. As shown in FIGS. 1 and 3, the display 3 is provided, for example, on an instrument panel in front of a driver's seat in the vehicle V. In the illustrated example, the display 3 may be a display for a meter that displays various types of information such as a vehicle speed meter, or may be a display for multimedia. The display of the display 3 is controlled by an ECU 10.

ECU 10 includes a storage unit 11, a scene determination unit 12, a proposal determination unit 13, a proposal execution unit 14, and a light distribution control function operating unit 15 as functional configurations. The storage unit 11 stores travel history information D. The travel history information D includes information on the number of ignition-on times of the vehicle V from the previous light distribution control activation proposal, the travel distance of the previous light distribution control activation proposal, and the operation rate of the light distribution control function. The ignition on is an operation of turning on an ignition switch which is a switch for starting and stopping a drive source or the like of the vehicle V. The number of times the ignition is turned on and the traveling distance can be acquired by various known sensors or the like. The operation rate of the light distribution control function is a ratio of the traveling time traveled in a state where the light distribution control function is activated to the total traveling time. For example, when 50 h is running 100 h and AHB is running, the light distribution control function has an activation rate of 50%.

The scene determination unit 12 determines whether or not the scene on which the vehicle V travels is a recommendation scene based on the camera image acquired by the camera 1. For example, the recommendation scene is a scene in which the brightness around the vehicle V is dark and continues for a predetermined time or longer. The state in which the brightness is dark is, for example, a state in which the brightness is equal to or less than a predetermined constant brightness. The predetermined time is a preset time. A scene 20 in which the brightness around the vehicle V is dark and continues for a predetermined time or longer corresponds to a scene in which the vehicle V travels in the suburbs.

When the scene determination unit 12 determines that the scene in which the vehicle V travels is a recommendation scene, the proposal determination unit 13 determines whether or not to make a light distribution control activation proposal based on the number of ignition-on times and the travel distance of the vehicle V from the previous light distribution control activation proposal. Specifically, the proposal determination unit 13 determines that the light distribution control activation proposal is to be made when the operation rate of the light distribution control function is equal to or less than a predetermined value, the number of times of ignition-on of the vehicle V from the previous light distribution control activation proposal is equal to or more than a predetermined number of times, and the travel distance of the vehicle V from the previous light distribution control activation proposal is equal to or more than a predetermined distance. The predetermined value is, for example, a value of 50% or less. The predetermined number of times is, for example, 10 or more times. The constant distance is, for example, a distance of 100 km or more. When the light distribution control function is not currently deactivated (off), the proposal determination unit 13 does not make the light distribution control activation proposal. Whether the light distribution control function is activated or deactivated may be determined based on, for example, an operation of the occupant received via the steering switch 2 or the like.

The proposal execution unit 14 executes the light distribution control activation proposal according to the result of the determination by the proposal determination unit 13. Specifically, the proposal execution unit 14 controls the display 3 when it is determined by the proposal determination unit 13 that the light distribution control activation proposal is to be made. For example, as illustrated in FIG. 3, the proposal execution unit 14 causes the display 3 to display, as a light distribution control activation proposal, a notification T that prompts the occupant to activate (turn on) the light distribution control function. In the illustrated exemplary notification T, the "⊙ switch" corresponds to the determination switch 2*a* of the steering switch 2.

The light distribution control function operating unit 15 activates the light distribution control function when the determination switch 2*a* of the steering switch 2 is pressed by the occupant while the notification T is displayed on the display 3 as, for example, a light distribution control activation proposal. Note that the notification T on the display 3 is deleted from the display 3 when the cancellation switch 2*b* of the steering switch 2 is pressed.

Figure 4:
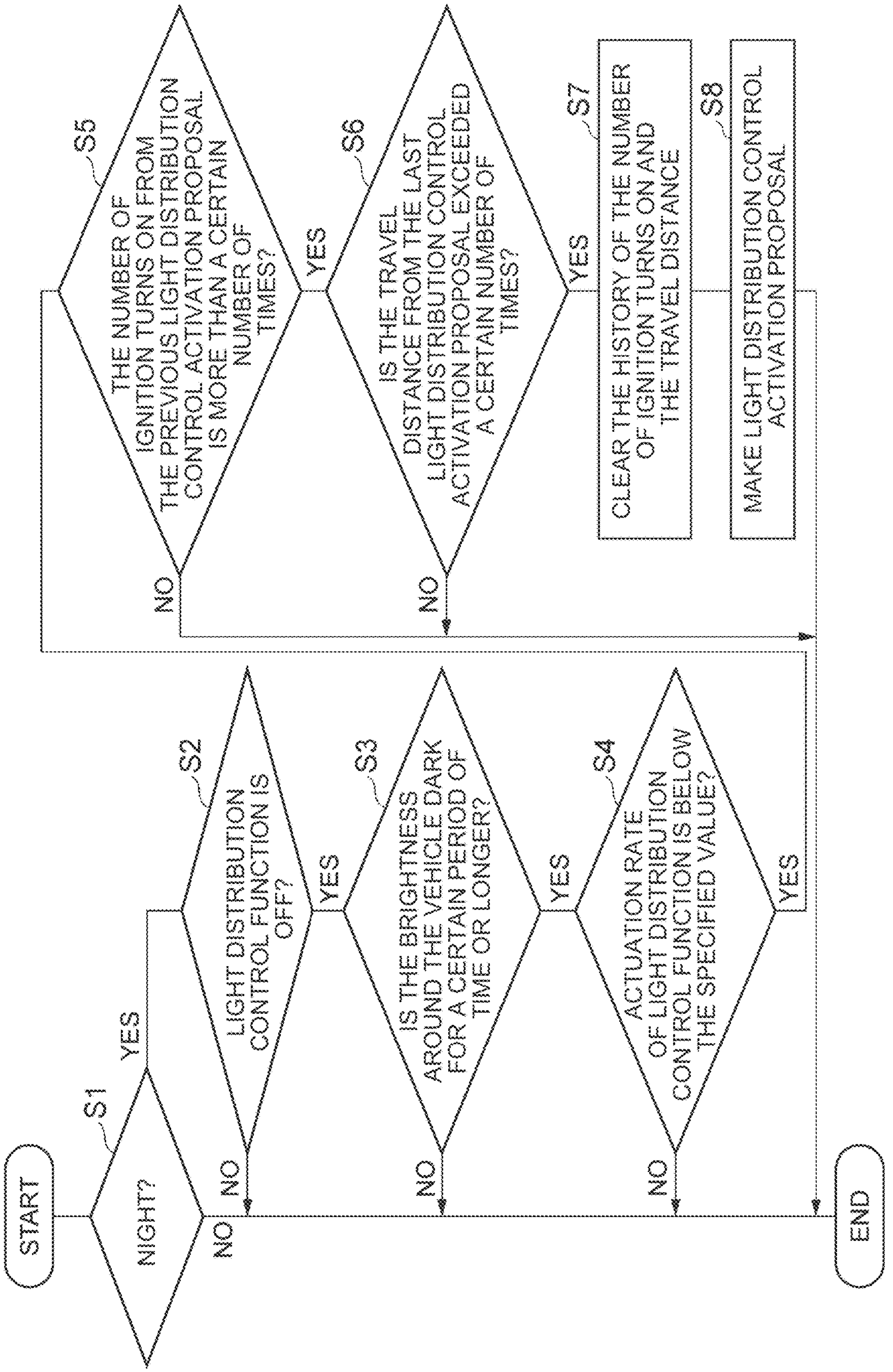
FIG. 4 is a flowchart illustrating processing of the vehicle light distribution control device of FIG. 1.

Next, processing in the vehicle light distribution control device 100 will be described with reference to the flowchart of FIG. 4.

For example, when the ignition is turned on in the vehicle V, ECU 10 starts the following series of processes. First, based on the camera images of the camera 1, the scene determination unit 12 determines whether or not the present time zone is at night (S1). If S1 is YES, the proposal determination unit 13 determines whether or not the light distribution control function is not activated (S2). If YES in the above S2, the scene determination unit 12 determines whether or not the brightness around the vehicle V continues for a predetermined period or longer (S3).

When S3 is YES, the scene determination unit 12 determines that the scene in which the vehicle V is currently traveling is the recommendation scene. Then, the proposal determination unit 13 determines whether or not the operation rate of the light distribution control function is equal to or less than a predetermined value based on the travel history information D stored in the storage unit 11 (S4). If YES in the above S4, the proposal determination unit 13 determines whether or not the number of times of ignition-on from the previous light distribution control activation proposal is equal to or more than a certain number of times based on the travel history information D stored in the storage unit 11 (S5).

If YES in the above S5, the proposal determination unit 13 determines whether or not the travel distance from the previous light distribution control activation proposal is equal to or greater than a predetermined distance based on the travel history information D stored in the storage unit 11 (S6). If YES in the above S6, the number of times of ignition-on and the history of travel-distance in the travel history information D stored in the storage unit 11 are cleared (S7). Then, the light distribution control activation proposal is executed by the proposal execution unit 14, and a notification T prompting to activate the light distribution control function is displayed on the display 3 (S8).

On the other hand, when S1 to S6 are NO, the process of this cycle is ended, and the process of S1 in the subsequent cycle is repeated. Note that, for example, in the case where the ignition is turned off, which is an operation of turning off the ignition switch, in the vehicle V, the above-described processing is ended.

As described above, the vehicle light distribution control device 100 makes the light distribution control activation proposal when the scene in which the vehicle V having the light distribution control function travels is the recommendation scene. Therefore, the light distribution control function is not automatically activated, and the troublesomeness felt by the occupant who considers that the light distribution control function is unnecessary can be reduced. In addition, it is possible to promote the use of the light distribution control function for an occupant who does not use or recognize the light distribution control function, and an occupant who does not recognize that the light distribution control function is not activated, and to improve the operation rate of the light distribution control function, thereby contributing to safety and security of nighttime traveling.

When the scene in which the vehicle V travels is a recommendation scene, the vehicle light distribution control device 100 determines whether or not to make a light distribution control activation proposal based on the number of ignition-on times and the travel distance of the vehicle V from the previous light distribution control activation proposal. The vehicle light distribution control device 100 makes the light distribution control activation proposal in accordance with the result of the determination. In this case, the frequency at which the light distribution control activation proposal is made can be adjusted to reduce the troublesomeness felt by the occupant, and the use of the light distribution control function can be promoted.

In the vehicle light distribution control device 100, the recommendation scene is a scene in which the brightness around the vehicle V continues for a predetermined time or longer. When the scene in which the vehicle V travels is a recommendation scene, the vehicle light distribution control device 100 proposes the light distribution control operation when the number of times of ignition-on of the vehicle V from the previous light distribution control activation proposal is equal to or more than a predetermined number of times and the travel distance of the vehicle V from the previous light distribution control activation proposal is equal to or more than a predetermined distance. In this case, the frequency at which the light distribution control activation proposal is made can be specifically adjusted to reduce the troublesomeness felt by the occupant, and the use of the light distribution control function can be promoted.

When the scene in which the vehicle V travels is a recommendation scene, the vehicle light distribution control device 100 proposes the light distribution control operation when the operation rate of the light distribution control function is equal to or less than a predetermined value, the number of times of ignition-on of the vehicle V from the previous light distribution control activation proposal is equal to or greater than a predetermined number of times, and the travel distance of the vehicle V from the previous light distribution control activation proposal is equal to or greater than a predetermined distance. In this case, the frequency at which the light distribution control activation proposal is made can be more specifically adjusted to reduce the troublesomeness felt by the occupant, and the use of the light distribution control function can be promoted.

Since the light distribution control activation proposal is made when the operation rate of the light distribution control function is equal to or less than the predetermined value, the light distribution control activation proposal can be effectively made for an occupant who uses or does not recognize the light distribution control function.

In the present embodiment, the vehicle light distribution control device 100 constitutes an interactive proposal system in the high beam system of the vehicle V. In the vehicle light distribution control device 100, the light distribution control function is activated when the occupant performs an operation input by the steering switch 2 or the like in response to a proposal displayed on the display 3 or the like. Further, in the vehicle light distribution control device 100, since the number of proposals also leads to troublesomeness, by utilizing the travel history information D, it is possible to reduce the troublesomeness, it is possible to increase the opportunity to use the system.

It is considered that there are a certain number of occupants who do not want the system to operate the light distribution control function on their own. The vehicle light distribution control device 100 does not automatically operate the light distribution control function. The vehicle light distribution control device 100 recommends the occupant to operate the light distribution control function in consideration of the surrounding environment or the travel history. This makes it possible to reduce the troublesomeness for the occupant.

Although the embodiments have been described above, one aspect of the present disclosure is not limited to the above-described embodiments. One aspect of the present disclosure can be implemented in various forms with various modifications and improvements based on the knowledge of those skilled in the art, including the above-described embodiments.

In the above embodiment, the notification T is displayed on the display 3 as the light distribution control activation proposal, but the present disclosure is not limited to this. The light distribution control activation proposal may be a proposal by display other than the notification T, or may be a proposal by voice instead of or in addition to the proposal. In the above-described embodiment, a scene in which the brightness around the vehicle V is dark for a predetermined time or longer is adopted as the recommendation scene, but the present disclosure is not limited thereto. The recommendation scene may be various other scenes as long as it is a recommendation scene in which the use of the light distribution control function is recommended.

What is claimed is:

1. A vehicle light distribution control device comprising a processor configured to:

when a scene in which a vehicle having a light distribution control function travels is a recommendation scene in which use of the light distribution control function for a headlight of the vehicle is recommended, make a light distribution control activation proposal to an occupant of the vehicle to propose activation of the light distribution control function;

when the scene in which the vehicle travels is the recommendation scene, make determination as to whether to make the light distribution control activation proposal based on a number of times of ignition-on of the vehicle and a travel distance of the vehicle since the light distribution control activation proposal was made previously;

make the light distribution control activation proposal according to a result of the determination; and make the light distribution control activation proposal when the scene in which the vehicle travels is the recommendation scene, the number of times of the ignition-on of the vehicle since the light distribution control activation proposal was made previously is equal to or larger than a predetermined number of times, and the travel distance of the vehicle since the light distribution control activation proposal was made previously is equal to or larger than a predetermined distance, wherein:

the recommendation scene is a scene in which a brightness of surroundings of the vehicle is low continuously for a predetermined period or longer at night.

2. The vehicle light distribution control device according to claim 1, wherein the processor is further configured to make the light distribution control activation proposal when an activation rate of the light distribution control function is equal to or lower than a predetermined value.

* * * * *